No. 802,164. PATENTED OCT. 17, 1905.
H. L. HOPKINS.
SPRING ACTUATED MEANS FOR INCREASING THE TENSION BETWEEN THE BLADES OF SHEARS.
APPLICATION FILED JAN. 23, 1905.

WITNESSES:
C. H. Swift
J. W. Carroll

INVENTOR.
Harvey L. Hopkins.
BY Harry Lea Dodson
ATTORNEY.

UNITED STATES PATENT OFFICE.

HARVEY L. HOPKINS, OF CHICAGO, ILLINOIS, ASSIGNOR TO ALBERT N. EASTMAN, OF CHICAGO, ILLINOIS.

SPRING-ACTUATED MEANS FOR INCREASING THE TENSION BETWEEN THE BLADES OF SHEARS.

No. 802,164. Specification of Letters Patent. Patented Oct. 17, 1905.

Application filed January 23, 1905. Serial No. 242,260.

*To all whom it may concern:*

Be it known that I, HARVEY L. HOPKINS, a citizen of the United States, residing at Chicago, in the county of Cook and State of Illinois, have invented certain new and useful Improvements in Spring-Actuated Means for Increasing the Tension Between the Blades of Shears, of which the following is a specification.

My invention relates to that class of devices which has for its object to produce a shear cut between the blades of shears at all times, and has for its object to furnish a device whereby the action of the closing of shears will produce a shear cut and which will be so adjusted as to cause the greatest tension to be exerted by the device when the points of the shears are closing, which is the time when it is most needed, and to accomplish the above result by utilizing the bevel of the blade of the shear to increase the tension of the spring.

My method of attaining the foregoing objects may be more readily comprehended by having reference to the accompanying drawings, which are hereunto annexed and are a part of this specification, in which—

Figure 1:
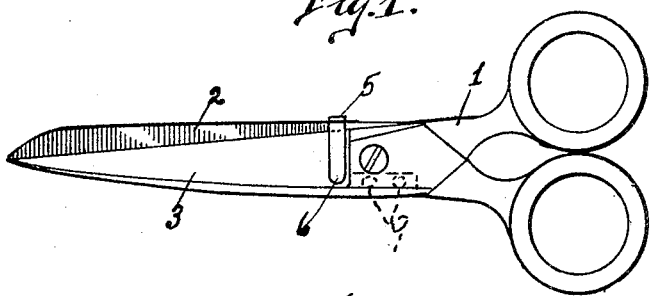
Figure 2:
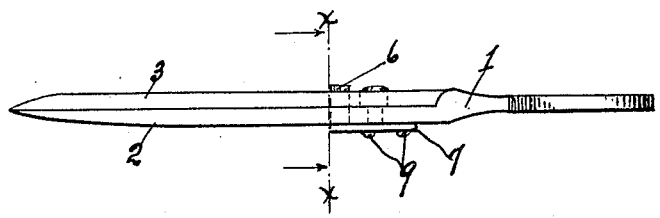
Figure 3:
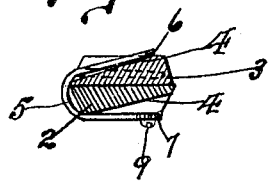
Figure 4:
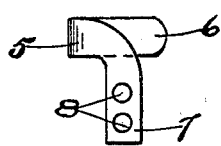
Figure 5:
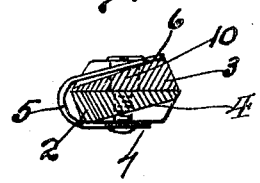

Figure 1 is a top or plan view of a pair of shears, showing my improved attachment. Fig. 2 is a side elevation. Fig. 3 is an enlarged detail view taken in section across the line X X in the direction indicated by the arrows. Fig. 4 is an enlarged detail view of the attachment. Fig. 5 is an enlarged detail showing a modified method of attaching the device to the shears.

Similar figures refer to similar parts throughout the entire description.

In the drawings, 1 is a pair of shears of the usual construction having blades 2 and 3. These blades are constructed, as is usual, with a bevel-face 4. My attachment consists of a device, (better seen in Fig. 4,) of a piece formed, preferably, from spring metal with a loop 5, having ends 6 and 7, the end 7 being bent approximately at right angles thereto, said end having holes 8 formed therein for the purpose of securing the attachment to the shears, which may be done by the use of screws 9 or any other convenient method.

In the modified form shown in Fig. 5 the device is shown attached to the pivot-screw 10, the screw end of which is extended through the end 7 of the device and secured thereto, which avoids the necessity of any additional fastening on the shear-blade. The natural position of the loop is indicated by the dotted lines in Fig. 3, the end 6 being engaged by the face of the bevel, and when the shears are closed the piece assumes the position shown in the same figure.

It will be apparent upon an inspection of the drawings that the device exerts its greatest pressure when the blades are fully closed, whereas when the cutting is being done close to the pivot where very little or no additional pressure is required none is exerted.

Although I have shown and described a precise construction, I do not wish to be limited thereto, as my invention consists of the use of the bevel on the blade of the shear to increase and regulate the tension existing between the blades, and it is this which I desire to protect.

Having described my invention, what I regard as new, and desire to secure by Letters Patent, is—

1. In combination, a pair of scissors or shears, the blades of which have beveled faces; a metal strip secured to one of the blades, a portion of the strip being bent at right angles and engaging the bevel-face of the remaining blade, and means for securing the strip to the blade.

2. In combination, a pair of shears or scissors, the blades of which have beveled faces, a spring carried by one of the blades engaging the beveled surface of the remaining blade, the tension of the spring being increased by the movement in one direction of the beveled face with which it contacts.

3. In a device of the character described, the combination with a pair of scissors or shears, of a strip of metal formed into a loop, one of the ends of which is bent at right angles and adapted to be held in place by an extended pivot-screw, the opposite end engaging the bevel-face of the shear-blade, for the purpose set forth substantially as described.

HARVEY L. HOPKINS.

Witnesses:
S. W. BENDER,
M. M. CUTLER.